United States Patent
Nakanishi et al.

(10) Patent No.: US 7,391,490 B2
(45) Date of Patent: Jun. 24, 2008

(54) LIQUID CRYSTAL DISPLAY

(75) Inventors: Yohei Nakanishi, Tenri (JP); Tsuyoshi Kamada, Kanagawa (JP); Kazuya Ueda, Kanagawa (JP); Hideaki Tsuda, Kanagawa (JP)

(73) Assignee: Sharp Kabushiki Kaisha, Osaka (JP)

( * ) Notice: Subject to any disclaimer, the term of this patent is extended or adjusted under 35 U.S.C. 154(b) by 218 days.

(21) Appl. No.: 11/332,484

(22) Filed: Jan. 17, 2006
(Under 37 CFR 1.47)

(65) Prior Publication Data
US 2007/0019144 A1 Jan. 25, 2007

(30) Foreign Application Priority Data
Jan. 20, 2005 (JP) .............................. 2005-012680

(51) Int. Cl.
*G02F 1/1337* (2006.01)
(52) U.S. Cl. ........................................ 349/129; 349/191
(58) Field of Classification Search ................. 349/129, 349/130, 191
See application file for complete search history.

(56) References Cited

U.S. PATENT DOCUMENTS

2003/0043336 A1 3/2003 Sasaki et al.
2004/0233357 A1* 11/2004 Fujimori et al. ............. 349/113
2004/0246423 A1* 12/2004 Sasabayashi et al. ........ 349/130

FOREIGN PATENT DOCUMENTS

JP 2003-149647 5/2003

* cited by examiner

*Primary Examiner*—Michael H Caley
(74) *Attorney, Agent, or Firm*—Nixon & Vanderhye, P.C.

(57) ABSTRACT

The invention relates to liquid crystal displays used in television receivers and display sections of electronic apparatus and, more particularly, to a liquid crystal display in which a polymeric material included in a liquid crystal material is polymerized to impart a pre-tilt angle to the liquid crystal material. The invention provides a liquid crystal display in which gradation/luminance characteristics in an oblique direction are improved and in which reduction in luminance is suppressed. The liquid crystal display includes a TFT substrate and an opposite substrate provided opposite to each other and a liquid crystal composition including a liquid crystal material and a polymer sealed between the substrates. A pixel region of the liquid crystal display has a first sub-pixel formed with a first pixel electrode electrically connected to a source electrode of a TFT through a connection electrode and two second sub-pixels formed with two second pixel electrodes which sandwich an insulation film with the connection electrode to form a control capacitance and which are separated from the first pixel electrode.

19 Claims, 12 Drawing Sheets

LIQUID CRYSTAL DISPLAY

BACKGROUND OF THE INVENTION

1. Field of the Invention

The present invention relates to liquid crystal displays used in television receivers and display sections of electronic apparatus and, more particularly, to a liquid crystal display in which a polymeric material included in a liquid crystal material is polymerized to impart a pre-tilt angle to the liquid crystal material.

2. Description of the Related Art

There is a recent trend toward larger display screens in the field of liquid crystal displays having a liquid crystal display panel for the use of such displays as display sections of television receivers. For this reason, higher display quality is required for liquid crystal displays. However, it is difficult to achieve characteristics required for a display section of a television receiver using a liquid crystal display employing the TN (Twisted Nematic) method which has been the main stream of the field because of the narrow viewing angle resulting from the method. Under the circumstance, techniques other than the TN method are currently being put in use in order to achieve the property of a wide viewing angle. One of such techniques is referred to as MVA (Multi-domain Vertical Alignment) method. In an MVA type liquid crystal display, liquid crystal molecules in a liquid crystal layer sealed between two substrates combined in a face-to-face relationship are aligned perpendicular to the substrates, and the alignment of the liquid crystal molecules is regulated by protrusions formed on the substrates or slits, provided on a transparent electrode (ITO).

It is known in general that when the vertical alignment method in which liquid crystal molecules are aligned perpendicular to substrates, optical characteristics measured in a direction oblique to a direction normal to the display screen are different from optical characteristics in the normal direction. FIG. 11 is a graph showing characteristics of luminance relative to input gradations (gradation/luminance characteristics) of a vertical alignment type liquid crystal display. The abscissa axis represents input gradations (in gray scale), and the ordinate axis represents luminance (T/Twhite) normalized with reference to the luminance of display of white (TWhite). The curve in a solid line in the figure indicates gradation/luminance characteristics in a direction perpendicular to the display screen (hereinafter referred to as a square direction), and the curve connecting black triangular symbols in the figure indicates gradation/luminance characteristics in a direction at an azimuth angle of 90° and a polar angle of 60° to the display screen (hereinafter referred to as an oblique direction). An azimuth angle is an angle measured counterclockwise with reference to the direction to the right of the display screen. A polar angle is an angle to a line that is vertical to the center of the display screen.

As shown in FIG. 11, gradation/luminance characteristics in a direction oblique to the direction of a polarization axis significantly deviate from gradation/luminance characteristic in the square direction. For example, luminance in the oblique direction is higher than luminance in the square direction in the range of gradations from 0 to 210, whereas luminance in the oblique direction is lower than luminance in the square direction in the range of gradations from 210 to 255 or higher. As a result, when the screen is viewed in the oblique direction, there are small differences in luminance between input gradations, and the color of an image appears more whitish compared to a view of the same in the square direction.

A known solution to this problem is a liquid crystal display having a pixel structure including a pixel electrode electrically connected to a source electrode of a thin film transistor (TFT) for a pixel and another pixel electrode that is separated from the pixel electrode and insulated from the source electrode. In such a liquid crystal display, an electrostatic capacitance is formed by the pixel electrode insulated from the source electrode, the source electrode, and an insulation film sandwiched between the two electrodes. The pixel electrode insulated from the source electrode is driven by the electrostatic capacitance.

FIG. 12 shows a configuration of one pixel of a liquid crystal display having the pixel structure including two separated pixel electrodes. As shown in FIG. 12, a gate bus line 106 and a plurality of drain bus lines 108 are formed on a glass substrate 103, the drain bus lines extending across the gate bus line 106 with an insulation film (not shown) interposed between them. A TFT 110 is disposed in the vicinity of an intersection between the gate bus line 106 and a drain bus line 108, a TFT being formed at each pixel. A part of the gate bus line 106 serves as a gate electrode 110c of the TFT 110. An active semiconductor layer and a channel protection film (both of which are not shown) of the TFT 110 are formed above the gate bus line 106 with an insulation film interposed. A drain electrode 110a along with an n-type impurity semiconductor layer (not shown) underlying the same and a source electrode 110b along with an n-type impurity semiconductor layer (not shown) underlying the same are formed on the channel protection film of the TFT 110 above the gate electrode 110c, the electrodes facing each other across a predetermined gap.

A storage capacitor bus line 114 is formed to extend in parallel with the gate bus line 106 across a pixel region which is defined by the gate bus line 106 and the drain bus lines 108. A storage capacitor electrode (intermediate electrode) 116 is formed at each pixel above the storage capacitor bus line 114 with an insulation film interposed between them. The storage capacitor electrode 116 is electrically connected to the source electrode 110b of the TFT 110 through a connection electrode 111. A storage capacitor Cs is formed by the storage capacitor bus line 114, the storage capacitor electrode 116, and the insulation film sandwiched between them.

The pixel region defined by the gate bus line 106 and the drain bus lines 108 is divided into a sub-pixel 120 and a sub-pixel 122. For example, the sub-pixel 120, which has a trapezoidal shape, is disposed on the left side of a central part of the pixel region, and the sub-pixel 122 is disposed in upper part and lower parts of the pixel region and on the right side of the central part excluding the area of the sub-pixel 120. Referring to the disposition of the sub-pixels 120 and 122 in the pixel region, they are substantially line symmetric about the storage capacitor bus line 114. A pixel electrode 121 is formed at the sub-pixel 120, and a pixel electrode 123, which is separate from the pixel electrode 121, is formed at the sub-pixel 122. Both of the pixel electrodes 121 and 123 are constituted by a transparent conductive film such as an ITO. The pixel electrode 121 is electrically connected to the storage capacitor electrode 116 and the source electrode 110b of the TFT 110 through a contact hole 118 which is an opening in a protective film (not shown). The pixel electrode 123 has a region which overlaps the connection electrode 111 with a protective film and an insulation film interposed between them. In that region, an electrostatic capacitance Cc is formed by the connection electrode 111, the pixel electrode 123, and the protective film sandwiched between the electrodes 111 and 123.

A common electrode, which is not shown, is formed on an opposite glass substrate (not shown) provided opposite to the glass substrate 103. A linear protrusion 112a as an alignment regulating structure for regulating the direction of alignment of the liquid crystal is formed so as to protrude from the opposite glass substrate in a position opposite to the connecting electrode 111 diagonally extending in the figure. A linear protrusion 112b is formed so as to protrude from the opposite glass substrate in a position in which it is substantially line symmetric with the liner protrusion 112a about the storage capacitor bus line 114. Further, a V-shaped linear protrusion 112c is formed such that it is disposed above the pixel electrode 121 on the left side of the central part of the pixel region. The linear protrusion 112c is substantially line symmetric about the storage capacitor bus line 114.

At the sub-pixel 120, a liquid crystal capacitance Clc1 is formed by pixel electrode 121, the common electrode, and the liquid crystal sandwiched between those electrodes. At the sub-pixel 122, a liquid crystal capacitance Clc2 is formed by the pixel electrode 123, the common electrode, and the liquid crystal sandwiched between those electrodes. The liquid crystal capacitance Clc2 and the electrostatic capacitance Cc are connected in series between the glass substrate 103 and the opposite glass substrate.

When the TFT 110 is turned on, the source electrode 110b and the connection electrode 111 bear the same potential as a gradation voltage $V_D$ applied to a drain bus line 108, and the pixel electrode 121 in electrical connection with them also bears the same potential as the gradation voltage $V_D$. A voltage originating from a potential difference applied between the pixel electrode 121 and the common electrode is applied to the liquid crystal capacitance Clc1. For example, when the voltage applied to the common electrode is 0 V, the voltage applied to the liquid crystal capacitance Clc1 is equal to the gradation voltage $V_D$ ($=V_D-0V$). On the other hand, the pixel electrode 123, which is electrically insulated, is applied with a voltage that is obtained by dividing the gradation voltage $V_D$ based on the ratio between the liquid crystal capacitance Clc2 and the electrostatic capacitance Cc. The voltage applied to the pixel electrode 123 (represented by $V_1$) can be expressed as follows.

$$V_1 = V_D \times \{Cc/(Clc2+Cc)\} \quad (1)$$

As apparent from the above, there is a difference between thresholds of the pixel electrode 121 which is electrically connected to the source electrode 110b and the pixel electrode 123 which is insulated from the same. Consequently, gradation/luminance characteristics in an oblique direction are significantly improved. As shown in FIG. 11, the curve representing gradation/luminance characteristics in a square direction bulges downward. On the contrary, the curve indicating gradation/luminance characteristics in an oblique direction of an MVA type display in the related art is a mixture of a range in which the curve greatly bulges upward (the range of gradations from 0 to about 210) and a range in which the curve bulges downward (the range of gradations from about 210 to 255). Therefore, missing or spreading gradations can be generated depending on gradation data to be displayed, which results in variation of the color of an image. In the case of a liquid crystal display having the pixel structure shown in FIG. 12, a curve indicating gradation/luminance characteristics of the apparatus in a direction oblique thereto will include substantially no upward or downward bulge, and the apparatus will have significantly high gradation characteristics.

Patent Document 1: JP-A-2003-149647

A liquid crystal display having the pixel structure shown in FIG. 12 can provide improved gradation/luminance characteristics in an oblique direction. However, as indicated by Expression 1, the voltage V1 applied to the liquid crystal capacitance Clc2 of the sub-pixel 122 decreases below the gradation voltage $V_D$. Therefore, the absolute value of the luminance in an oblique direction of the liquid crystal display is smaller than that of a liquid crystal display without such a pixel structure. Further, since a pixel region of the liquid crystal display is divided into two regions, the disposition of the linear protrusions (bank-like structures) and slits in the pixel electrodes (gaps in the pixel electrodes 121 and 123) become complicated. A problem consequently arises in that the aperture ratio is substantially reduced to reduce luminance.

SUMMARY OF THE INVENTION

It is an object of the invention to provide a liquid crystal display in which gradation/luminance characteristics in an oblique direction are improved and in which reduction in luminance is suppressed.

The above-described object is achieved by a liquid crystal display, characterized in that it includes a substrate, an opposite substrate provided opposite to the substrate, a liquid crystal composition including a liquid crystal material, and a polymer obtained by polymerizing a polymeric material by light or heat and sealed between the substrate and the opposite substrate, an alignment regulating structure for regulating the direction of alignment of the liquid crystal material, a gate bus line formed on the substrate, a drain bus line formed across the gate bus line with an insulation film interposed between them, a pixel transistor having a gate electrode electrically connected to the gate bus line, a drain electrode electrically connected to the drain bus line, and a source electrode provided above the gate electrode and opposite to the drain electrode with a predetermined gap left between them, and a pixel region having a first sub-pixel formed with a first pixel electrode electrically connected to the source electrode through a connection electrode and a second sub-pixel formed with a second pixel electrode which sandwiches an insulation film between itself and the connection electrode to form a predetermined electric capacitance and which is separated from the first pixel electrode.

The present invention makes it possible to provide a liquid crystal display in which gradation/luminance characteristics in an oblique direction are improved and in which reduction in luminance is suppressed.

BRIEF DESCRIPTION OF THE INVENTION

DESCRIPTION OF THE PREFERRED EMBODIMENTS

First Embodiment

Figure 1:
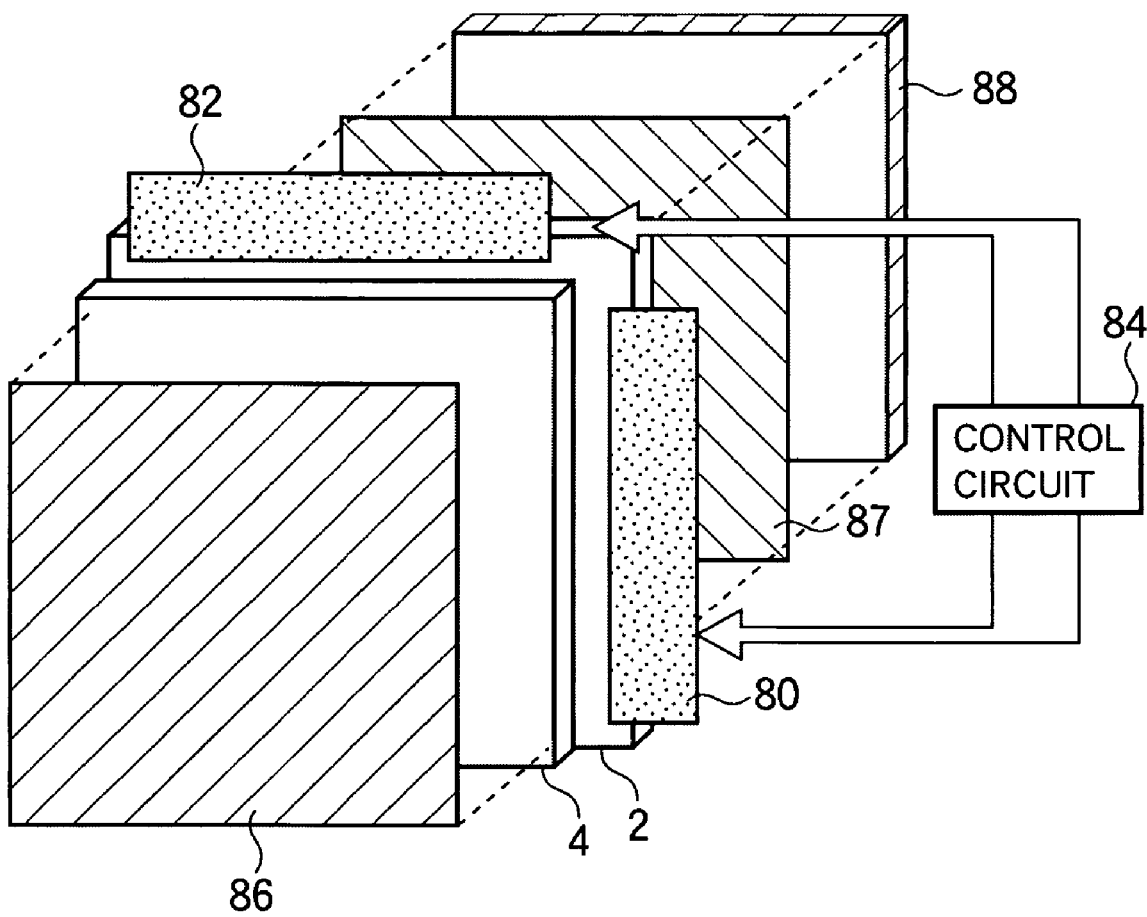
FIG. 1 shows a schematic configuration of a liquid crystal display according to a first embodiment of the invention.

A liquid crystal display according to a first embodiment of the invention will be described with reference to FIGS. 1 to 5. First, a configuration of the liquid crystal display of the present embodiment will be described with reference to FIG. 1. As shown in FIG. 1, for example, the liquid crystal display which is an MVA type display, has a liquid crystal display panel constructed by combining a TFT substrate 2 having such as a pixel electrode and a TFT formed at each pixel region thereof and an opposite substrate 4 having such as a CF layer formed thereon in a face-to-face relationship and sealing a liquid crystal material having negative dielectric constant anisotropy between the substrate. Vertical alignment films for aligning liquid crystal molecules in the liquid crystal material in, for example, a direction perpendicular to substrate surfaces are formed on surfaces of the substrates 2 and 4 facing each other.

A gate bus line driving circuit 80 loaded with a driver IC for driving a plurality of gate bus lines and a drain bus line driving circuit 82 loaded with a driver IC for driving a plurality of drain bus lines are provided on the TFT substrate 2. The driving circuits 80 and 82 output scan signals and data signals to predetermined gate bus lines and drain bus lines based on predetermined signals output by a control circuit 84.

A polarizer 87 is applied to a surface of the TFT substrate 2 that is opposite to the surface thereof on which the elements are formed. A backlight unit 88 constituted by, for example, a linear primary light source and a planar light guide plate is disposed on a side of the polarizer 87 that is opposite to the side thereof facing the TFT substrate 2. A polarizer 86 is applied to a surface of the opposite substrate 4 that is opposite to the surface thereof on which a resin CF layer is formed.

Figure 2A:
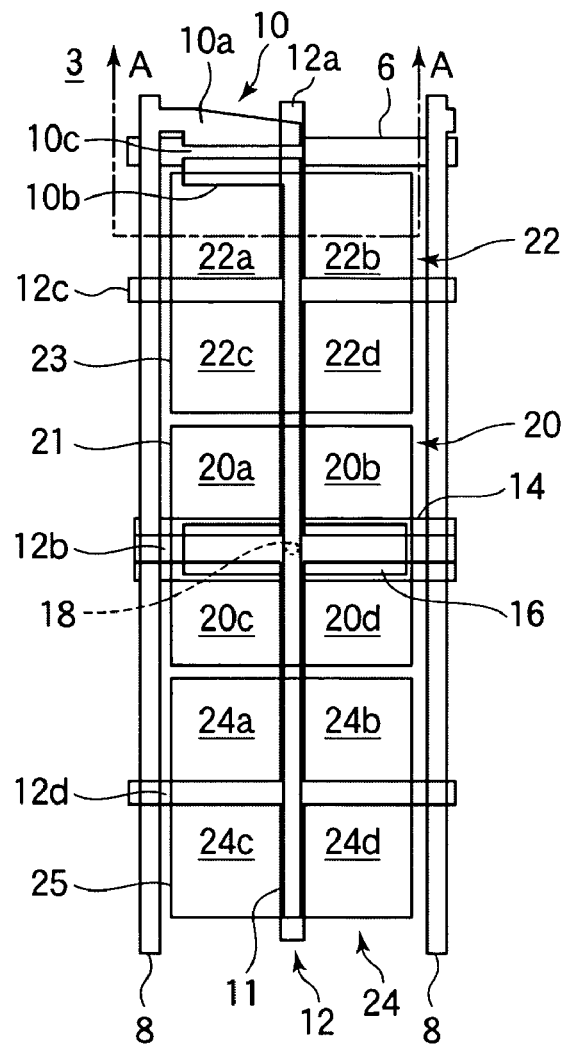
FIGS. 2A and 2B show a configuration of one pixel of the liquid crystal display according to the first embodiment of the invention.
Figure 2B:
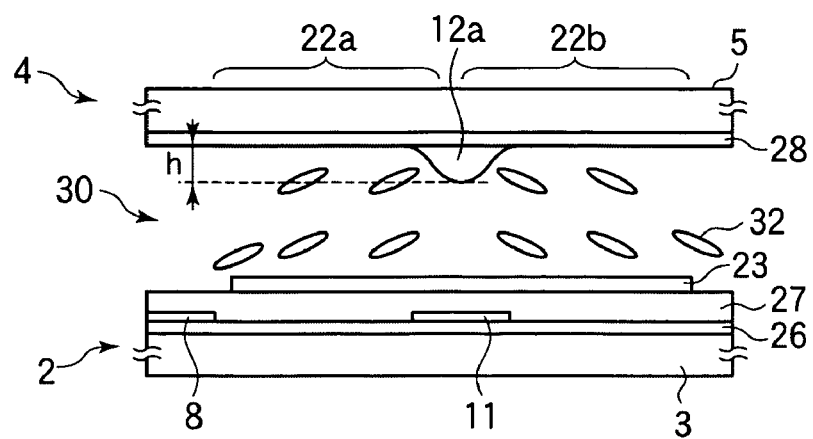

FIGS. 2A and 2B show a configuration of one pixel of the liquid crystal display of the present embodiment. FIG. 2A shows a configuration of one of a plurality of pixels formed like a matrix as viewed in a direction normal to a glass substrate 3. FIG. 2B is a view of a section taken along the line A-A indicated by a chain line in FIG. 2A. As shown in FIG. 2B, the liquid crystal display has the TFT substrate 2 and the opposite substrate 4 provided opposite to each other, and a liquid crystal composition 30 sealed between the substrates 2 and 4. The liquid crystal composition 30 includes a liquid crystal material which is aligned substantially perpendicularly to substrate surfaces when no voltage is applied and which has negative dielectric constant anisotropy and a polymer which is provided as a result of polymerization of a polymeric material (a monomer or oligomer) by light or heat.

For example, the liquid crystal composition 30 includes 0.3% diacrylate monomer by weight as the polymeric material. Although not shown, an alignment film having vertically aligning properties is formed on each of surfaces of the TFT substrate 2 and the opposite substrate 4 facing each other.

As shown in FIGS. 2A and 2B, the TFT substrate 2 has a gate bus line 6 formed on a glass substrate 3 and a plurality of drain bus lines 8 formed so as to extend across the gate bus line 6 with an insulation film 26 interposed between them. A TFT (a pixel transistor) 10 is disposed in the vicinity of an intersection between the gate bus line 6 and a drain bus line 8, a TFT being formed at each pixel.

The TFT 10 has a gate electrode 10c which is electrically connected to the gate bus line 6, a drain electrode 10a which is electrically connected to a drain bus line 8, and a source electrode 10b which is disposed above the gate electrode 10c so as to face the drain electrode 10a with a predetermined gap left between them. A part of the gate bus line 6 serves as the gate electrode 10c of the TFT 10. An active semiconductor layer and a channel protection film (both of which are not shown) of the TFT 10 are formed above the gate bus line 6 with the insulation film 26 interposed. The drain electrode 10a along with an n-type impurity semiconductor layer (not shown) underlying the same and the source electrode 10b along with an n-type impurity semiconductor layer (not shown) underlying the same are formed on a channel protection film of the TFT 10 above the gate electrode 10c, the electrodes facing each other across a predetermined gap.

A storage capacitor bus line 14 is formed to extend in parallel with the gate bus line 6 across a pixel region which is defined by the gate bus line 6 and the drain bus lines 8. A connection electrode 11, which is electrically connected to the source electrode 10b, is formed substantially in the middle of the pixel region across the storage capacitor bus line 14 so as to extend in parallel with the drain bus lines 8. The drain electrode 10a, the source electrode 10b, and the connection electrode are formed in the same layer as the drain bus lines 8. A storage capacitor electrode (intermediate electrode) 16 is formed at each pixel above the storage capacitor bus line 14 with an insulation film 26 interposed between them. The storage capacitor electrode 16 is electrically connected to the source electrode 10b of the TFT 10 through the connection electrode 11. A storage capacitor Cs is formed by the storage capacitor bus line 14, the storage capacitor electrode 16, and the insulation film 26 sandwiched between them.

The pixel region defined by the gate bus line 6 and the drain bus lines 8 is divided into a first sub-pixel 20 and two second sub-pixels 22 and 24 which are disposed side by side in the extending direction of the drain bus lines 8. The first sub-pixel 20 has a first pixel electrode 21 formed in a substantially square shape. The first pixel electrode 21 is constituted by a transparent conductive film such as an ITO. The first pixel electrode 21 is electrically connected to the connection electrode 11, storage capacitor electrode 16 and the source electrode 10b of the TFT 10 through a contact hole 18 which is an opening in a protective film 27 formed above the pixel region.

The second sub-pixel 22 has a second pixel electrode 23 formed in a substantially square shape. The second sub-pixel 24 has a second pixel electrode 25 formed in a substantially square shape. The second pixel electrodes 23 and 25 are constituted by a transparent conductive film such as an ITO. The second pixel electrodes 23 and 25 are formed separately from the first pixel electrode 21 and are in therefore a floating state. A control capacitance (a predetermined electrical capacitance) Cc1 is formed by the second pixel electrode 23, the connection electrode 11, and the protective film (insulation film) 27 sandwiched between the electrodes 11 and 23.

Similarly, a control capacitance (a predetermined electrical capacitance) Cc1' is formed by the second pixel electrode 25, the connection electrode 11, and the protective film (insulation film) 27 sandwiched between the electrodes 11 and 25. The second pixel electrodes 23 and 25 are disposed side by side in the extending direction of the drain bus lines 8 so as to sandwich the first pixel electrode 21.

The opposite substrate 4 includes a common electrode 28 constituted by a transparent conductive film formed on a glass substrate 5. The opposite substrate 4 includes a linear protrusion (bank-like structure) 12 which is formed to protrude from the glass substrate 5 and which serves as an alignment regulating structure for regulating the direction of alignment of liquid crystal molecules 32 in the liquid crystal material. The linear protrusion 12 is formed with a height h of about 0.7 µm. As shown in FIG. 2A, the linear protrusion 12 has a trunk portion 12a, a first branch portion 12b, and second branch portions 12c and 12d. The trunk portion 12a extends substantially in the middle of the pixel region substantially in parallel with the drain bus lines 8, and the portion is formed across the first and the second sub-pixels 20, 22, and 24. The first branch portion 12b is formed in the region of the first sub-pixel 20 so as to extend substantially orthogonally to the trunk portion 12a. The second branch portions 12c and 12d are formed in the regions of the sub-pixels 22 and 24, respectively, so as to extend substantially orthogonally to the trunk portion 12a. The trunk portion 12a is disposed opposite to the position where the connection electrode 11 is formed. The trunk portion 12a is formed so as to overlap the connection electrode 11 when viewed in a direction normal to the glass substrate 3.

The first and the second branch portions 12b, 12c, and 12d are formed so as to extend substantially in parallel with the gate bus line 6 across the drain bus lines 8 adjacent to each other. The first branch portion 12b provided in the region of the first sub-pixel 20 is formed so as to overlap the storage capacitor bus line 14 when viewed in the direction normal to the glass substrate 3. Any reduction in the aperture ratio can be prevented by disposing the trunk portion 12a and the first branch portion 12b in the pixel region in such a manner.

The first sub-pixel 20 is divided at the trunk portion 12a, the first branch portion 12b, and a peripheral part of the first pixel electrode 21 to provide four divisions 20a, 20b, 20c, and 20d. Similarly, when viewed in the direction normal to the glass substrate 3, the second sub-pixel 22 is divided at the trunk portion 12a, the second branch portion 12c, and a peripheral part of the second pixel electrode 23 to provide four divisions 22a, 22b, 22c, and 22d. Similarly, when viewed in the direction normal to the glass substrate 3, the second sub-pixel 24 is divided at the trunk portion 12a, the second branch portion 12d, and a peripheral part of the second pixel electrode 25 to provide four divisions 24a, 24b, 24c, and 24d.

When a voltage is applied between the first and the second pixel electrodes 21, 23 and 25 and the common electrode 28, the electric field applied to the liquid crystal composition 30 is distorted by the peripheral parts of the first and the second pixel electrodes 21, 23, and 25 and the linear protrusion 12. The distortion of the electric field regulates the alignment of the liquid crystal molecules 32 in the vicinity of the peripheral parts of the first and the second pixel electrodes 21, 23, and 25 and the linear protrusion 12. As a result, the liquid crystal molecules 32 are tilted in a different direction in each of the divisions 20a to 20d, the divisions 22a to 22d, and the divisions 24a to 24d. For example, in the section shown in FIG. 2B, the liquid crystal molecules 32 are tilted clockwise from the direction perpendicular to the TFT substrate 2 in the division 22a and are tilted counterclockwise in the division 22b. As thus described, the use of the MVA method allows the viewing angle characteristics of the liquid crystal display of the present embodiment to be improved.

At the first sub-pixel 20, a liquid crystal capacitance Clc1 is formed by the first pixel electrode 21, the common electrode 28, and the liquid crystal composition 30 sandwiched between the electrodes 21 and 28. At the second sub-pixel 22, a liquid crystal capacitance Clc2 is formed by the second pixel electrode 23, the common electrode 28, and the liquid crystal composition 30 sandwiched between the electrodes 23 and 28. The liquid crystal capacitance Clc2 is connected to the control capacitance Cc1 in series between the glass substrate 3 and the glass substrate 5. Similarly, at the second sub-pixel 24, a liquid crystal capacitance Clc2' is formed by the second pixel electrode 25, the common electrode 28, and the liquid crystal composition 30 sandwiched between the electrodes 25 and 28. The liquid crystal capacitance Clc2' is connected to a control capacitance Cc1' in series between the glass substrate 3 and the glass substrate 5.

When the TFT 10 is turned on, the source electrode 10b and the connection electrode 11 bear the same potential as a gradation voltage $V_D$ applied to a drain bus line 8, and the first pixel electrode 21 in electrical connection with them also bears the same potential as the gradation voltage $V_D$. A voltage originating from a potential difference applied between the first pixel electrode 21 and the common electrode 28 is applied to the liquid crystal capacitance Clc1. For example, when the voltage applied to the common electrode 28 is 0 V, the voltage applied to the liquid crystal capacitance Clc1 is equal to the gradation voltage $V_D$ (=$V_D$–0V). On the other hand, a voltage obtained by capacitance-dividing the gradation voltage $V_D$ based on the ratio between the liquid crystal capacitance Clc2 and the control capacitance Cc1 is applied to the second pixel electrode 23 which is capacitively coupled to the connection electrode 11. The voltage applied to the second pixel electrode 23 (represented by V) can be expressed as follows.

$$V = V_D \times \{Cc1/(Clc2+Cc1)\} \quad (2)$$

Similarly, a voltage obtained by capacitance-dividing the gradation voltage $V_D$ based on the ratio between the liquid crystal capacitance Clc2' and the control capacitance Cc1' is applied to the second pixel electrode 25. The voltage applied to the second pixel electrode 25 (represented by V') can be expressed as follows.

$$V' = V_D \times \{Cc1'/(Clc2'+Cc1')\} \quad (3)$$

Since one pixel region can be driven by different voltages as thus described, the gradation/luminance characteristics of the liquid crystal display in an oblique direction can be improved. While the voltages V and V' applied to the second pixel electrodes 23 and 25 may have the same value, three different gradation/luminance characteristics can be provided in the single pixel region at the same time when they are different voltage values. The viewing angle characteristics of the liquid crystal display can be further improved.

Figure 3A:
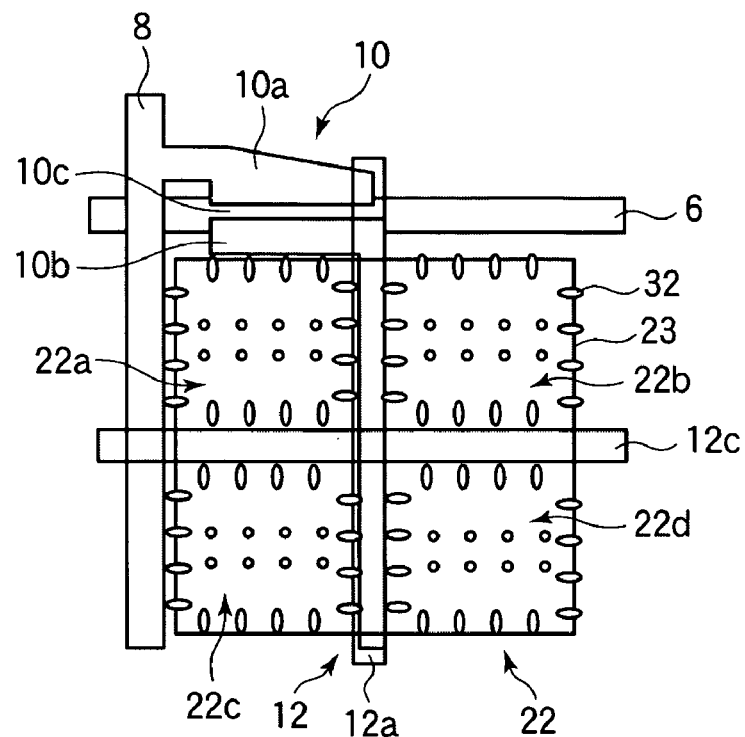
FIGS. 3A and 3B are enlarged views of a second sub-pixel 22 of the liquid crystal display according to the first embodiment of the invention.
Figure 3B:
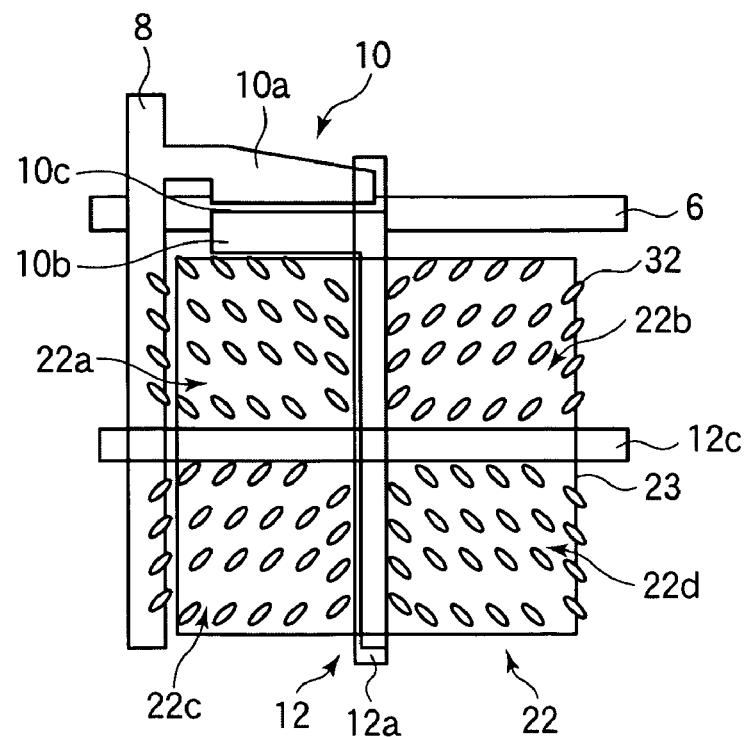

A method of manufacturing the liquid crystal display will now be described with reference to FIGS. 1 to 3B. FIGS. 3A and 3B are enlarged views of the second sub-pixel 22 taken in the direction normal to the glass substrate 3. FIG. 3A shows a state of the same before the monomer is polymerized. FIG. 3B shows a state of the same after the monomer is polymerized. As shown in FIG. 2B, the alignment films (vertical alignment films) are printed and baked on the surfaces of the TFT substrate 2 and the opposite substrate 4 facing to each other. The substrates 2 and 4 are combined by applying a seal material to the periphery of one of the substrates. The liquid crystal composition 30 is then injected between the substrates which are thereafter cut and chamfered to obtain a liquid crystal display panel.

When a voltage is applied between the substrates 2 and 4 after the liquid crystal composition 30 is injected, as shown in FIG. 3A, the liquid crystal molecules 32 begin declining in a direction perpendicular to the linear protrusion 12 or the periphery of the second pixel electrode 23. The periphery of the second pixel electrode 23 intersects with each of the trunk portion 12a and the second branch portion 12c at an angle of about 90°. The liquid crystal molecules 32 declining in respective directions collide with each other in the middle of the second sub-pixel 22 and finally settle at an angle of substantially 45° to the linear protrusion 12 or the periphery of the second pixel electrode 23 as shown in FIG. 3B.

When irradiated with ultraviolet light in this state, the diacrylate monomer mixed in the liquid crystal composition 30 is polymerized to fix the direction of alignment of the liquid crystal molecules 32. When a voltage is applied between the substrates 2 and 4 after the monomer is polymerized (after the irradiation with ultraviolet light), the liquid crystal molecules 32 immediately incline in a direction substantially at an angle of 45° to the linear protrusion 12 or the periphery of the second pixel electrode 23.

Next, polarizers 86 and 87 (see FIG. 1) are applied to outer surfaces of the substrates 2 and 4, respectively, on a crossed Nicols basis such that their polarization axes will be parallel or perpendicular to the linear protrusion 12 or the periphery of the second pixel electrode 23. Next, as shown in FIG. 1, the gate bus line driving circuit 80, the drain bus line driving circuit 82, and the control circuit 84 are mounted on the liquid crystal display panel. The backlight unit 88 is then disposed on a side of the polarizer 87 that is opposite to the side thereof facing the TFT substrate 2. Thus, a normally black liquid crystal display is completed.

As shown in FIG. 3B, the second sub pixel 22 has four divisions 22a, 22b, 22c, and 22d. The liquid crystal molecules 32 are tilted in different directions in the divisions 22a, 22b, 22c, and 22d, respectively. The liquid crystal molecules 32 in the division 22b are tilted substantially in parallel with a direction which is at a counterclockwise rotation of about 45° from the second branch portion 12c, the intersection between the trunk portion 12a and the second branch portion 12c being the axis of rotation. The liquid crystal molecules 32 in the division 22a are tilted substantially in parallel with a direction which is a rotation of about 135° in the same direction. The liquid crystal molecules 32 in the division 22c are tilted substantially in parallel with a direction which is a rotation of about 225° in the same direction. The liquid crystal molecules 32 in the division 22d are tilted substantially in parallel with a direction which is at a rotation of about 315° in the same direction. Although not shown, the liquid crystal molecules 32 in the divisions 20a to 20d of the first sub-pixel 20 and the divisions 24a to 24d of the second sub-pixel 24 are also tilted in the same directions as in the divisions 22a to 22d of the second sub-pixel 22, respectively. As a result, the liquid crystal display can be provided with the property of a wide viewing angle.

Figure 4A:
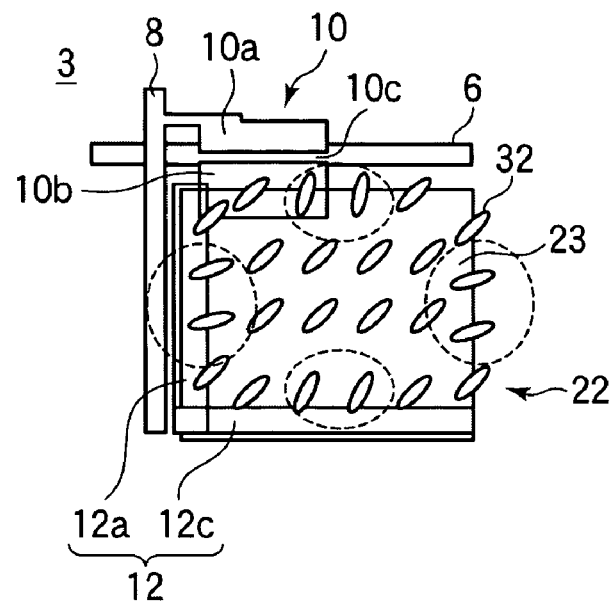
FIGS. 4A to 4C are illustrations for explaining a height h of a linear protrusion 12 of the liquid crystal display according to the first embodiment of the invention.
Figure 4B:
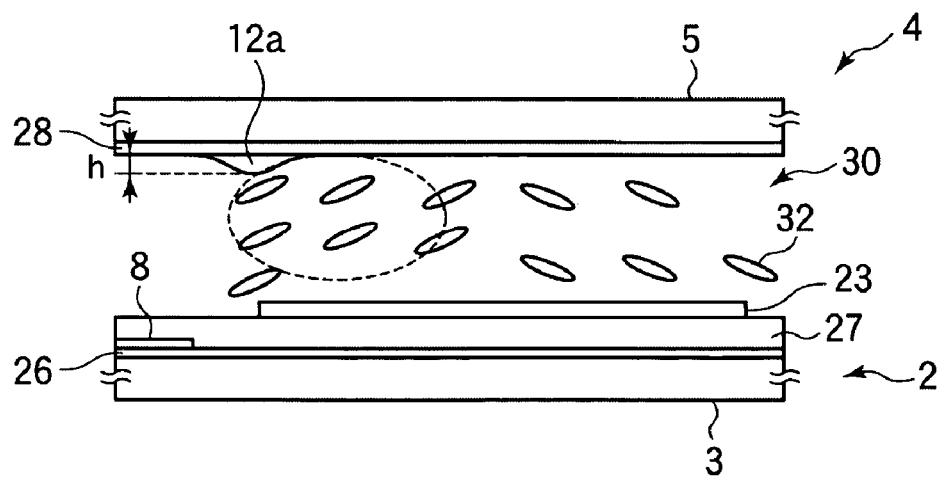
Figure 4C:
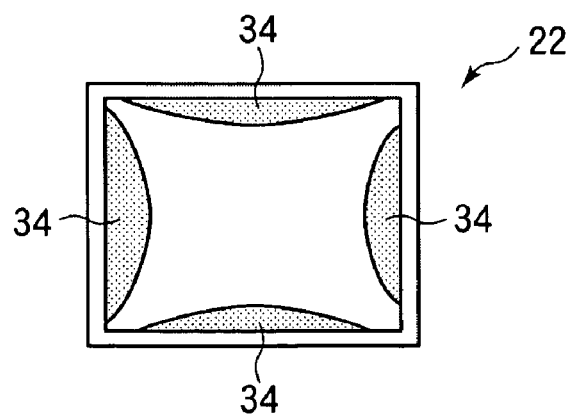

A description will now be made on the height h of the linear protrusion 12 with reference to FIGS. 4A to 4C. FIGS. 4A to 4C show the second sub-pixel 22 in a state in which the height h of the linear protrusion 12 is not an optimum value. FIG. 4A is an enlarged view of the second sub-pixel 22 taken in the direction normal to the glass substrate 3. FIG. 4B shows a section of the second sub-pixel 22. FIG. 4C shows a state of display of the second sub-pixel 22 photographed using a camera with a microscope. The connection electrode 11 is omitted in FIGS. 4A and 4B for easier understanding.

As shown in FIG. 4A, the trunk portion 12a of the linear protrusion 12 is formed in the vicinity of a drain bus line 8 in parallel with the same. The second branch portion 12c is substantially orthogonal to the trunk portion 12a and is formed on the peripheral part of the second pixel electrode 23 which is opposite to the peripheral part of the electrode in the vicinity of the gate bus line 6. When the linear protrusion 12 is formed with a height h of 0.35 μm which is smaller than the optimum height h of 0.7 μm, a force for regulating the alignment of the liquid crystal molecules 32 provided by an electric field at the linear protrusion 12 is smaller then an alignment regulating force provided by an electric field at the periphery of the second pixel region 23. As a result, when a voltage is applied between the substrates 2 and 4, some of the liquid crystal molecules 32 inline in a direction that is opposite to the direction in which the molecules are supposed to incline (the tilting direction of the five liquid crystal molecules 32 shown on the right side of FIG. 4B) as shown in the ellipse in a broken line in FIG. 4B. Thus, the alignment of the liquid crystal molecules 32 is disturbed.

When the linear protrusion 12 is formed with a height h of 1.4 μm which is greater than the optimum height h of 0.7 μm, the force for regulating the alignment of the liquid crystal molecules 32 provided by the electric field at the linear protrusion 12 is greater than the alignment regulating force provided by the electric field at the periphery of the second pixel region 23. As a result, the liquid crystal molecules 32 in the vicinity of the linear protrusion 12 cannot be tilted in a direction at an angle of 45° to the linear protrusion 12 as shown in the ellipses in broken lines in FIG. 4A. Thus, as shown in FIG. 4C, the second sub-pixel 22 has dark parts 34 which do not transmit light at the periphery thereof. Dark parts 34 are also generated because of a reduction in transmittance at the peripheral parts of the second pixel electrode 23 on the side thereof where the linear protrusion 12 is not formed. The display characteristics of the liquid crystal display are thus degraded both when the height h of the linear protrusion 12 is too great and when it is too small. Studies made by the present inventors have revealed that the optimum height h of the linear protrusion 12 is about 0.7 μm. The linear protrusion 12 of the liquid crystal display of the present embodiment is formed with a height of 0.7 μm.

As described above, one pixel region of the liquid crystal display can be driven by different voltages. In the liquid crystal display of the present embodiment, the capacitance values of the capacitances Clc1, Clc2, Cc1, Clc2', and Cc1' are set such that a threshold difference of 1 V is generated between the first sub-pixel 20 and the second sub-pixels 22 and 24. The ratio of the area of the first sub-pixel 20 to the area of the second sub-pixels 22 and 24 is set at 4:6. The threshold difference and the area ratio are not limited to those values, and the gradation/luminance characteristics of the liquid crystal display can be set as desired by changing those values.

Figure 5:
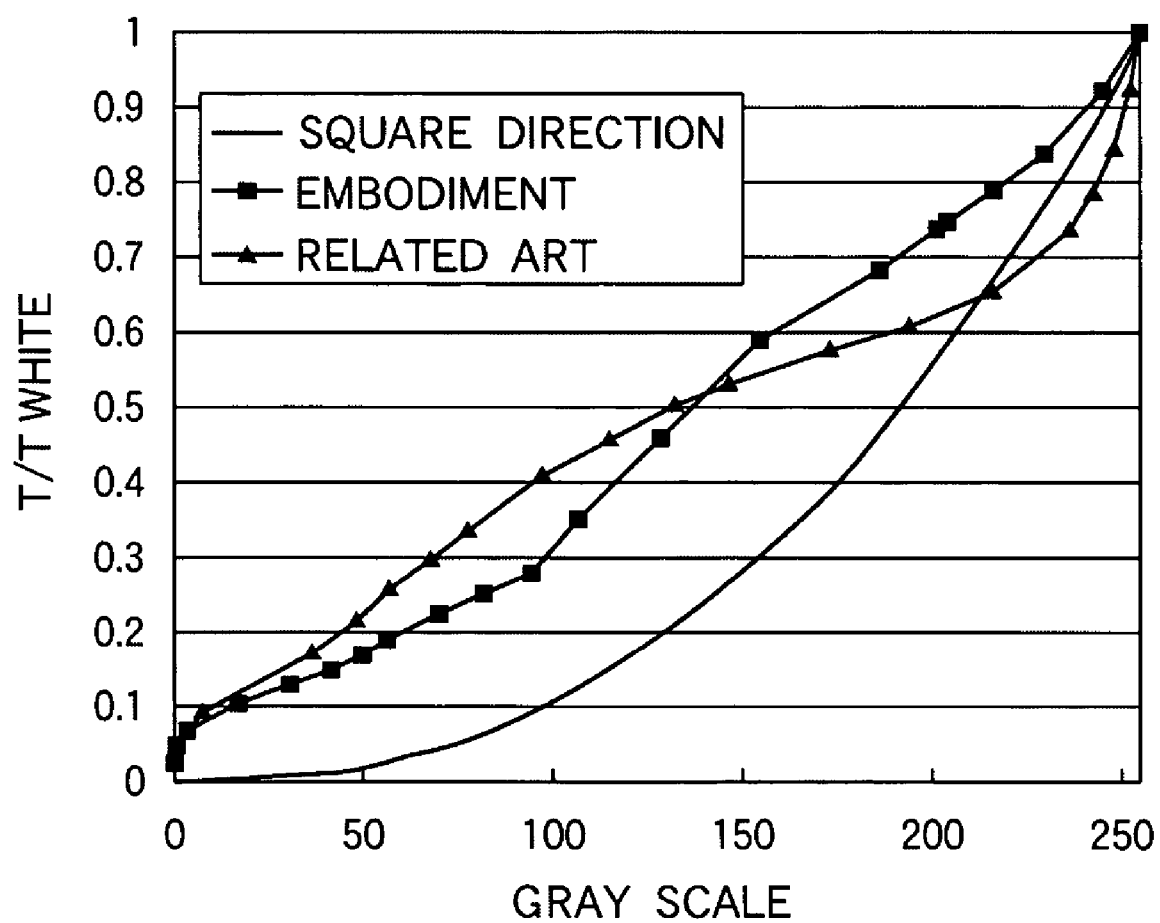
FIG. 5 shows gradation/luminance characteristics of the liquid crystal display according to the first embodiment of the invention.

FIG. 5 is a graph showing the characteristics of luminance relative to input gradations (gradation/luminance characteristics) of the vertical alignment type liquid crystal display of the present embodiment. The abscissa axis represents input gradations (in gray scale), and the ordinate axis represents luminance (T/Twhite) normalized with reference to the luminance of display of white (TWhite). The curve in a solid line in the figure indicates gradation/luminance characteristics of the liquid crystal display of the present embodiment obtained in a direction square to the same. The curve connecting black square symbols in the figure indicates gradation/luminance characteristics of the liquid crystal display of the present embodiment obtained in a direction oblique to the same. The curve connecting black triangular symbols in the figure indicates gradation/luminance characteristics of a liquid crystal display according to the related art obtained in a direction oblique to the same.

As shown in FIG. 5, the gradation/luminance characteristics of the liquid crystal display of the present embodiment in the oblique direction are significantly higher than the gradation/luminance characteristics in the related art. Referring to the gradation/luminance characteristics in the square direction, the luminance monotonously becomes higher as the input gradation becomes greater, and the curve indicating such characteristics opens upward. Referring to the gradation/luminance characteristics in the oblique direction in the related art, the luminance in the oblique direction is higher than the luminance in the square direction for gradations in the range from 0 to about 210, but the luminance in the oblique direction is lower than the luminance in the square direction for gradations of about 210 or more. The curve indicating such characteristics is a mixture of a part in which the curve greatly bulges upward and a part in which the curve bulges downward. As a result, when the display screen of the liquid crystal display according to the related art is viewed in the oblique direction, differences in luminance between input gradations are small. Thus, some gradations can be missed or spread, which can result in, for example, a change of a color of an image into a whitish color.

On the contrary, referring to the gradation/luminance characteristics of the liquid crystal display of the present embodiment in the direction oblique thereto, the luminance is higher than that the luminance in the square direction for all gradations. Unlike the curve indicating gradation/luminance characteristics according to the related art, the curve indicating such characteristics does not include a part in which the curve greatly bulges upward and a part in which the curve bulges downward. Therefore, there is no missing gradation or spreading gradation on the display screen of the liquid crystal display when viewed in a direction oblique thereto, and it is possible to prevent the color of an image from changing into a whitish color.

As shown in FIGS. 2A and 2B, the storage capacitor Cs of the liquid crystal display in the present embodiment is provided only at the first sub-pixel 20 having the first pixel electrode 21 electrically connected to the source electrode 10b through the connection electrode 11. The storage capacitor bus line 14 forming the storage capacitor Cs is disposed so as to extend substantially in the middle of the pixel region substantially in parallel with the gate bus line 6. The storage capacitor Cs is formed in the region where the storage capacitor bus line 14 and the storage capacitor electrode 16 overlap. The storage capacitor electrode 16 and the connection electrode 11 may be formed integrally with each other and may be formed in a cross-like shape when viewed in the direction normal to the glass substrate 3.

When a storage capacitor bus line is provided in parallel with the gate bus line 6 in each of the regions of the second sub-pixels 22 and 24 having the second pixel electrodes 23 and 25 capacitively coupled to the connection electrode 11, a part of a light-transmitting area of the pixel region is obscured. The transmittance of the liquid crystal display is consequently reduced. For this reason, no storage capacitor bus line is provided in the regions of the liquid crystal display of the present embodiment where the second sub-pixels 22 and 24 are formed. For example, a storage capacitor electrode formed integrally with the connection electrode 11 may be provided in the regions where the second sub-pixels 22 and 24 are formed, and a storage capacitor bus line may be disposed opposite to the storage capacitor electrode to form a storage capacitor between them, although the transmittance of the liquid crystal display is slightly reduced.

As described above, in the liquid crystal display of the present embodiment, the first sub-pixel 20 and the second sub-pixels 22 and 24, which can be driven by voltages different from one and the same gradation voltage $V_D$, are provided in a single pixel region. The liquid crystal display can therefore be provided with improved gradation/luminance characteristics in a direction oblique thereto. Further, the pixel region has a simple structure in which each of the first and the second sub-pixels 20, 22, and 24 having a square shape is divided by the linear protrusion 12 into four divisions in the form of a matrix. Therefore, the first and the second sub-pixels 20, 22, and 24 can be easily disposed, and the ratio of the area of the first and the second sub-pixels 21, 23, and 25 to the area of the pixel region can be made greater than the ratio of the area of the pixel electrodes 121 and 123 of the liquid crystal display according to the related art. As a result, the aperture ratio of the liquid crystal display of the present embodiment can be made higher than that of a liquid crystal display according to the related art to achieve higher luminance of the display screen.

Second Embodiment

Figure 6:
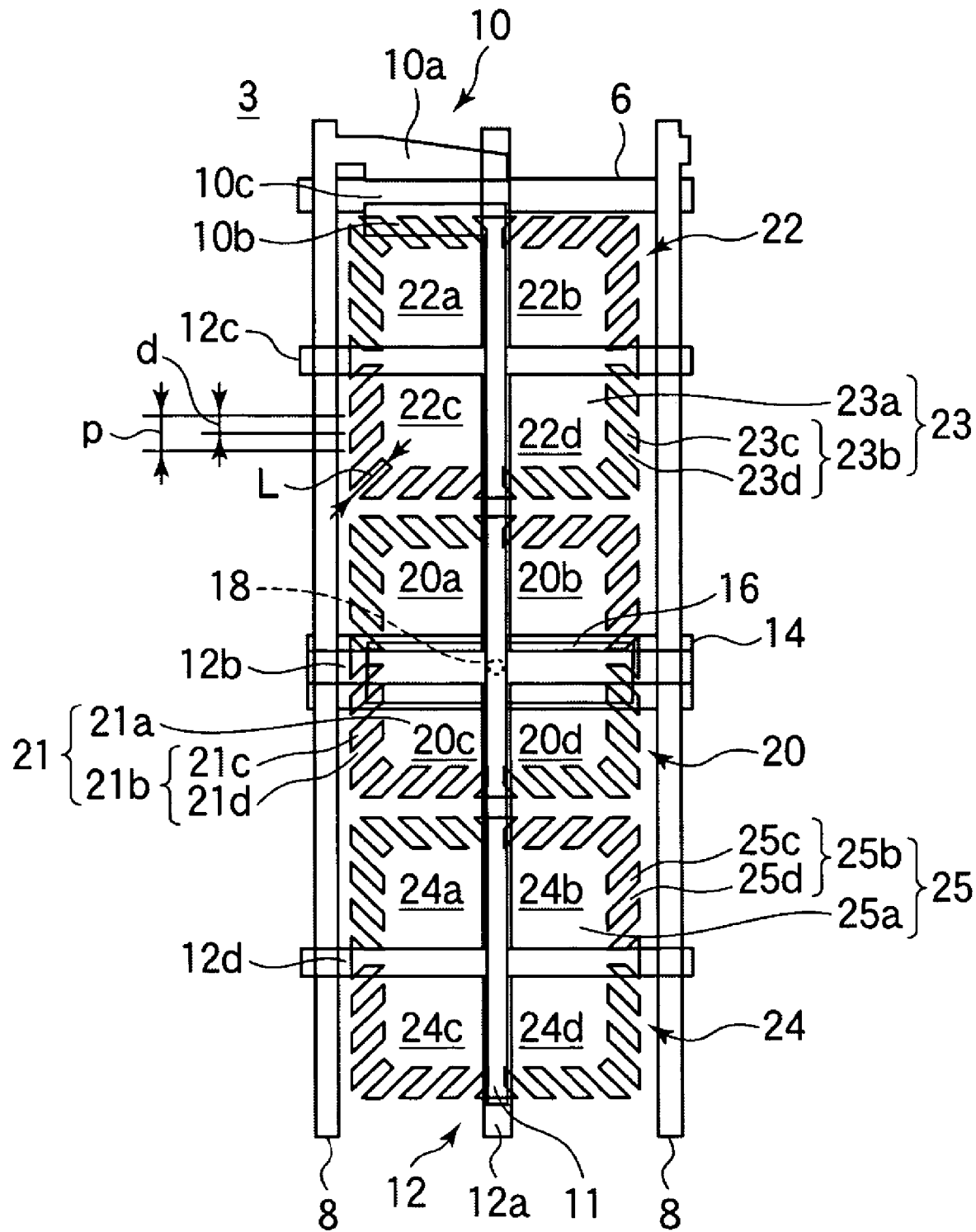
FIG. 6 shows a configuration of one pixel of a liquid crystal display according to a second embodiment of the invention.

A liquid crystal display according to a second embodiment of the invention will now be described with reference to FIGS. 6 to 9. The general configuration of the liquid crystal display of the present embodiment will not be described because it is similar to that of the liquid crystal display of the first embodiment. FIG. 6 shows a configuration of one of a plurality of pixels in the form of a matrix of the liquid crystal display of the present embodiment as viewed in a direction normal to a glass substrate 3. As shown in FIG. 6, the liquid crystal display of the present embodiment is characterized in that it includes a first pixel electrode 21 having a slit portion 21b formed in a direction substantially in parallel with the declining direction of a liquid crystal material and second pixel electrodes 23 and 25 having respective slit portions 23b and 25b providing the same effect as the slit portion 21b at the periphery thereof.

The first pixel electrode 21 includes a solid portion 21a disposed in the middle thereof and the slit portion 21b which is disposed around the solid portion 21a and which is formed like comb teeth. The slit portion 21b has a plurality of linear electrode parts 21c extending from the solid portion 21a and cut-out parts 21d formed between adjoining linear electrode parts 21c. The linear electrode parts 21c extend in four different directions in divisions 20a to 20d of the pixel, respectively. In FIG. 6, the linear electrode parts 21c in the division 20a extend upward and to the left, and the linear electrode parts 21c in the division 20b extend upward and to the right. The linear electrode parts 21c in the division 20c extend downward and to the left, and the linear electrode parts 21c in the division 20d extend downward and to the right. The liquid crystal molecules are tilted in parallel with the extending directions of the linear electrode parts 21c and toward the solid portion 21a. Thus, the alignment of the liquid crystal composition is divided in four directions in the first sub-pixel 20.

Similarly, the second pixel electrode 23 includes a solid portion 23a disposed in the middle thereof and the slit portion 23b which is disposed around the solid portion 23a and which is formed like comb teeth. The slit portion 23b has a plurality of linear electrode parts 23c extending from the solid portion 23a and cut-out parts 23d formed between adjoining linear electrode parts 23c. Similarly, the second pixel electrode 25 includes a solid portion 25a disposed in the middle thereof and the slit portion 25b which is disposed around the solid portion 25a and which is formed like comb teeth. The slit portion 25b has a plurality of linear electrode parts 25c extending from the solid portion 25a and cut-out parts 25d formed between adjoining linear electrode parts 25c. The liquid crystal molecules are tilted in parallel with the extending directions of the linear electrode parts 23c and 25c and toward the solid portions 23a and 25a. Thus, the alignment of the liquid crystal composition is divided in four directions in each of the second sub-pixels 22 and 24.

In the liquid crystal display of the first embodiment, the divisions 20a to 20d, 22a to 22d, and 24a to 24d are defined by the linear protrusions 12 and the peripheries of the first and the second pixel electrodes 21, 23, and 25. Since electric lines of force are sharply bent in the vicinity of the peripheries of the first and the second pixel electrodes 21, 23, and 25, a strong force acts to incline the liquid crystal molecules in directions at an angle of 90° to the extending directions of the peripheries. Therefore, the liquid crystal molecules cannot be directed at an angle of 45° to the extending directions of the peripheries, and the first and the second sub-pixels 20, 22, and 24 will have arcuate regions where transmittance is low (see FIG. 4C). The arcuate shapes have greater areas to reduce the transmittance of the liquid crystal display, the longer the peripheries of the first and the second pixel electrodes 21, 23, and 25.

In the liquid crystal display of the first embodiment, the liquid crystal composition 30 including a liquid crystal material and a polymer is used to prevent the generation of such arcuate regions. In the liquid crystal display of the present embodiment, as shown in FIG. 6, the first and the second pixel electrodes 21, 23, and 25 are formed with the respective slit portions 21b, 23b, and 25b to enhance an alignment regulating force for aligning the liquid crystal molecules in the directions at 45° to the extending directions of the peripheries. The slit portions 21b, 23b, and 25b are formed at a pitch P of 7 μm. The cut-out parts 21d, 23d, and 25d are formed with a width d of 3 μm and a length L of 7 μm. When the length L of the cut-out parts 21d, 23d, and 25d is too great, the width d can fluctuate due to slight fluctuations in processing of the parts. The liquid crystal display panel may consequently have minute luminance irregularities which can reduce display quality. For this reason, it is desirable to set the area of the slit portions 21b, 23b, and 25b within a range below one half of the total area of the first and the second pixel electrodes 21, 23, and 25. The cut-out parts 21d, 23d, and 25d are preferably formed to have a width d in the range from 2 μm to 5 μm, inclusive, and a length L in the range from 3 μm to 10 μm, inclusive.

In the liquid crystal display of the present embodiment, since the first and the second pixel electrodes 21, 23, and 25 are formed with the slit portions 21b, 23b, and 25b, substantially no arcuate region of low transmittance is generated. As a result, the transmittance of the liquid crystal display of the present embodiment is 15% higher than that of the liquid crystal display of the first embodiment, and higher luminance is therefore achieved on the display screen of the same.

The force for regulating the alignment of liquid crystal molecules is enhanced by the slit portions 21b, 23b, and 25b. The liquid crystal display therefore remains advantageous even when a point-like protrusion is provided, for example, at each of intersections between the trunk portion 12a and the first and the second branch portions 12b, 12c, and 12d instead of the linear protrusion 12.

Figure 7:
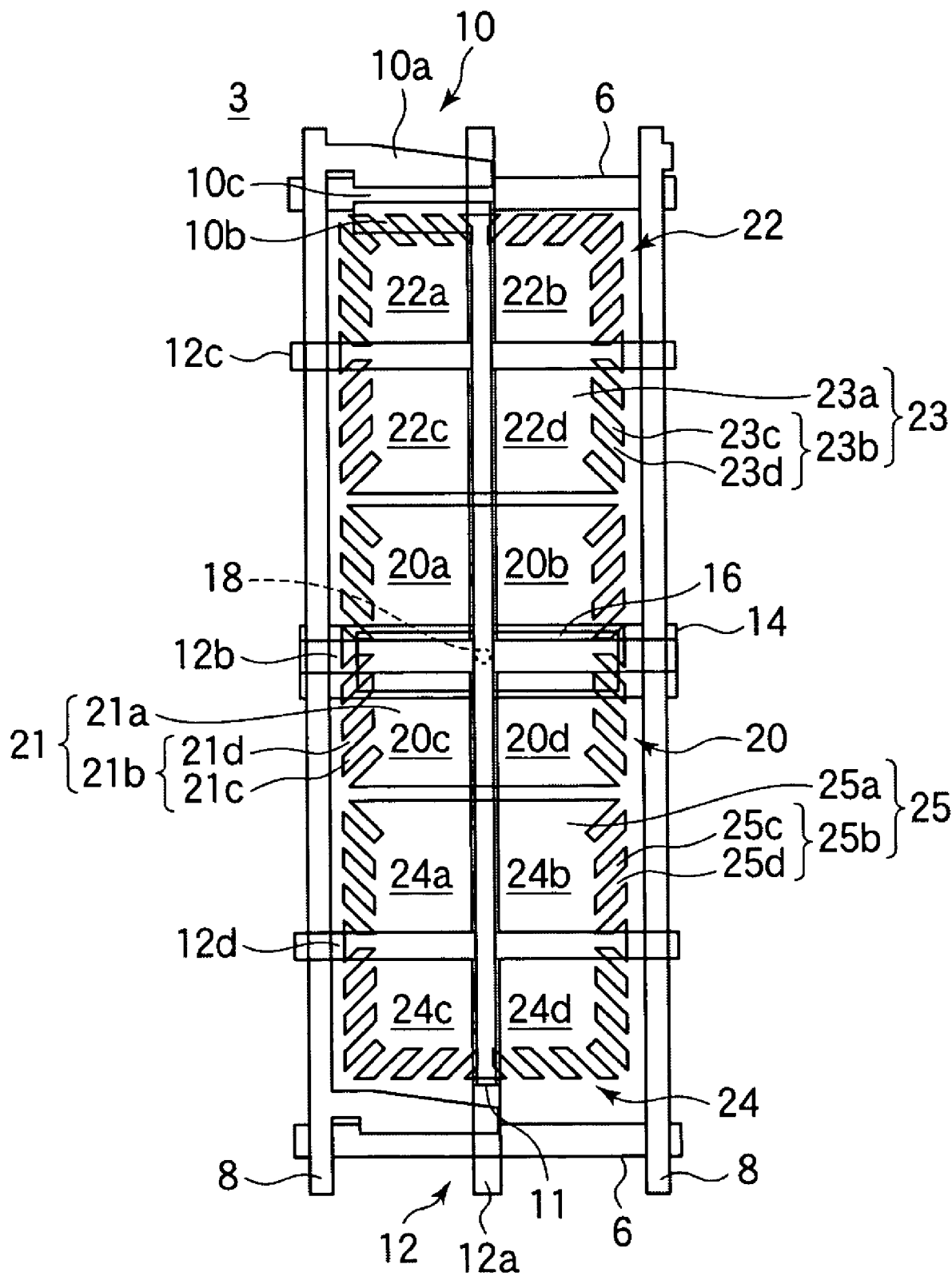
FIG. 7 shows a configuration of one pixel of a modification of the liquid crystal display according to the second embodiment of the invention.

A modification of the liquid crystal display of the present embodiment will now be described with reference to FIGS. 7 to 8B. FIG. 7 shows a configuration of one pixel of a liquid crystal display according to the present modification as viewed in a direction normal to the glass substrate 3. The liquid crystal display of the present modification is characterized in that the slit portions 21b, 23b, and 25b are formed at least in a part of the peripheries of the first and the second pixel electrodes 21, 23, and 25. As shown in FIG. 7, in the liquid crystal display of the present modification, the slit portions 21b, 23b, and 25b are formed only at the peripheries of the first and the second pixel electrodes 21, 23, and 25 in the vicinity of the gate bus line 6 and the drain bus lines 8. The slit portions 21b, 23b, and 25b are not formed at the peripheral regions where the first pixel electrode 21 adjoins the second pixel electrodes 23 and 25.

Figure 8A:
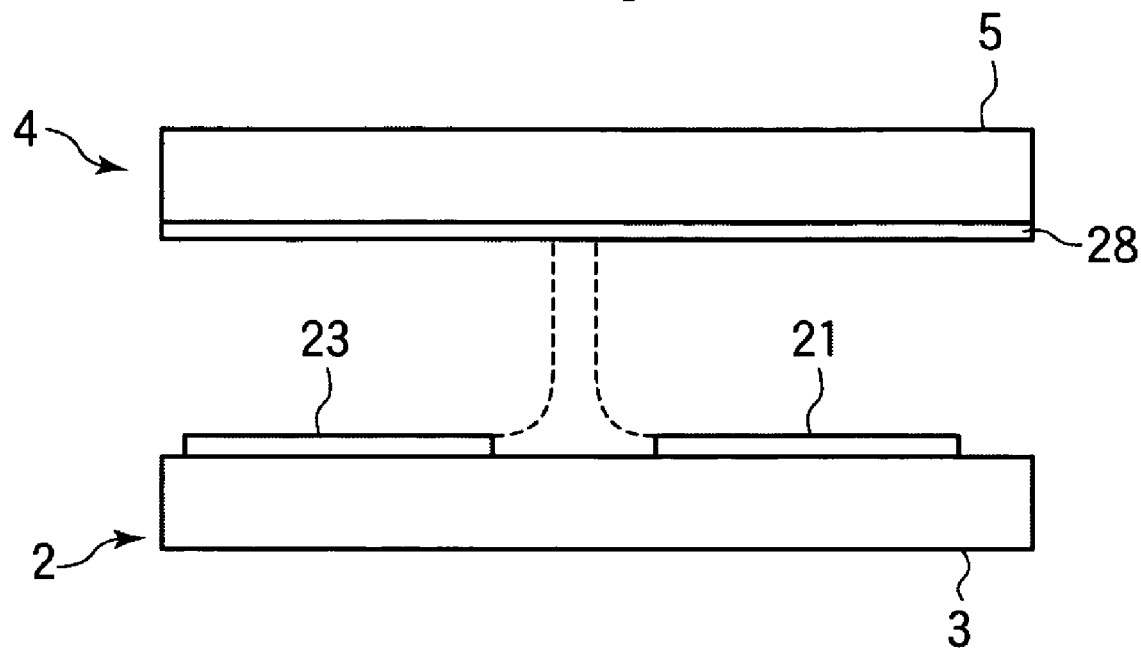
FIGS. 8A and 8B show a section of a pixel region of the modification of the liquid crystal display according to the second embodiment of the invention.
Figure 8B:
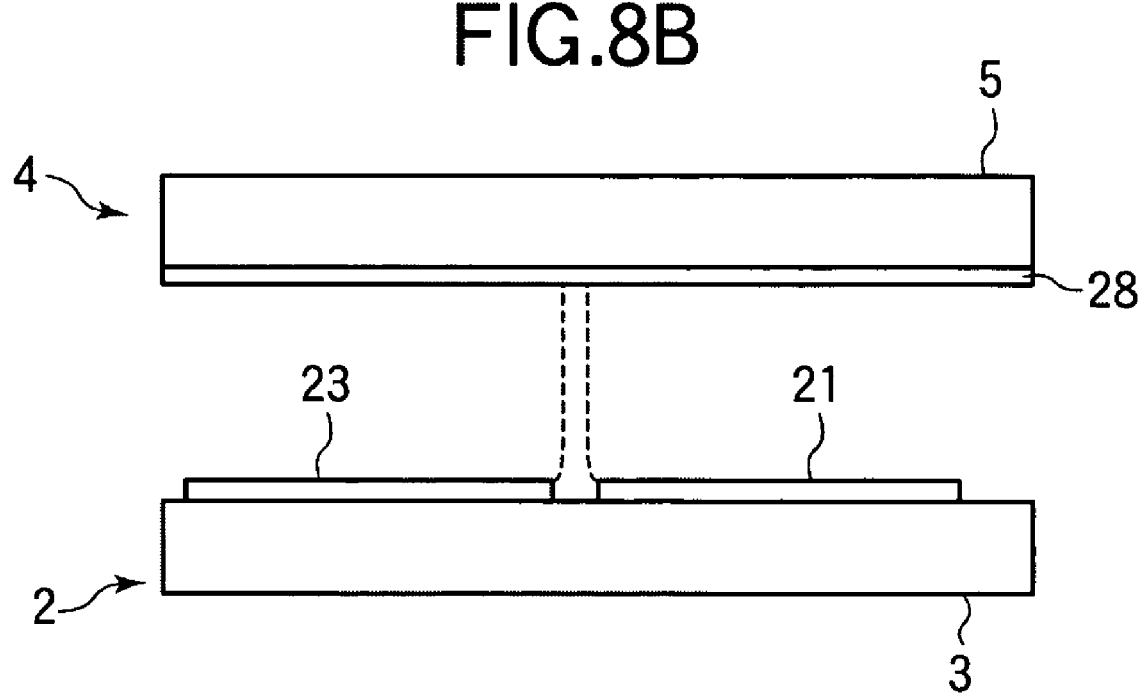

FIGS. 8A and 8B show a section of the pixel region. FIG. 8A shows a state in which a relatively large gap is provided between the first and the second pixel electrodes 21 and 23. FIG. 8B shows a state in which a relatively small gap is provided between the first and the second pixel electrodes 21 and 23. FIGS. 8A and 8B omit the linear protrusion 12, the liquid crystal molecules 32 and the like for easier understanding. As shown in FIGS. 8A and 8B, electric lines of force indicated by broken lines in the figure are more weakly bent, the smaller the gap between the first and the second pixel electrodes 21 and 23. As a result, the force for inclining the liquid crystal molecules in a direction at 90° to the extending directions of the peripheries of the first and the second pixel electrodes 21 and 23 becomes small. Therefore, it is easier to finally direct the liquid crystal molecules at 45° to the extending directions of the first and the second pixel electrodes 21 and 23, the smaller the gap between the first and the second pixel electrodes 21 and 23. Thus, substantially no arcuate dark part will be generated at the first and the second sub-pixels 20, 22, and 24.

In the liquid crystal display of the present modification, the gaps that the first pixel electrode 21 forms with the second pixel electrodes 23 and 25 are 4 μm. Thus, the slit portions 21b, 23b, and 25b are not required at the peripheral regions where the first pixel electrode 21 adjoins the second pixel electrodes 23 and 25, which reduces the risk of generation of luminance irregularities attributable to slight process fluctuations. Therefore, the liquid crystal display of the present modification provides the same advantage as that of the liquid crystal display of the embodiment.

Figure 9:
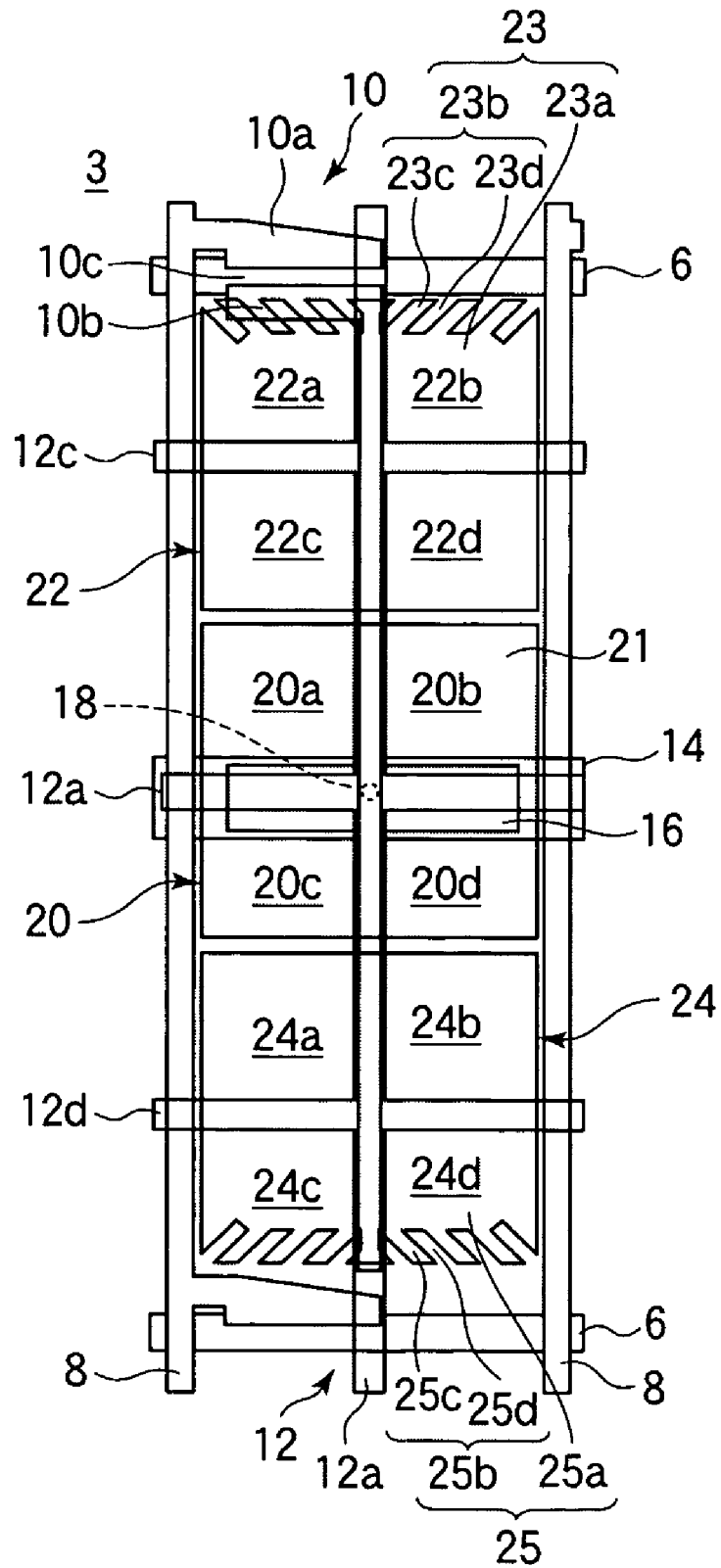
FIG. 9 show a configuration of one pixel of another modification of the liquid crystal display according to the second embodiment of the invention.

Another modification of the liquid crystal display of the present embodiment will now be described with reference to FIG. 9. FIG. 9 shows a configuration of one pixel of a liquid crystal display according to the present modification as viewed in a direction normal to the glass substrate 3. The liquid crystal display of the present modification is characterized in that the slit portions 21b, 23b, and 25b are formed in at least a part of the periphery of at least either the first pixel electrode 21 or the second pixel electrodes 23 and 25. As shown in FIG. 9, in the liquid crystal display of the present modification, the slit portions 23b and 25b are formed only at the peripheries of the second pixel electrodes 23 and 25 in the vicinity of the gate bus line 6. Therefore, the slit portion 21b is not formed at the first pixel electrode 21.

In the liquid crystal display of the present modification, the gaps between the first and the second pixel electrodes 21, 23, and 25 are formed smaller than the gaps in the above-described modification. Further, in the liquid crystal display of the present modification, the gaps between the first and the second pixel electrodes 21, 23, and 25 and the drain bus lines 8 are formed smaller than those gaps in the above-described modification. Thus, a conductive material is disposed close to the peripheries of the first and second pixel electrodes 21, 23, and 25. When diacrylate monomer is polymerized, the voltages at the first pixel electrode 21 and the drain bus lines 8 are made substantially equal to each other. Thus, electric lines of force extending from the peripheries of the first and the second pixel electrodes 21, 23, and 25 toward the common electrode 28 are more weakly bent except in the peripheral regions of the second pixel electrodes 23 and 25 adjacent to the drain bus line 6 (see FIGS. 8A and 8B). It is therefore easier to direct the liquid crystal molecules at 45° to the extending directions of the first and the second pixel electrodes 21, 23, and 25, and the generation of arcuate dark parts can be prevented at the first and the second sub-pixels 20, 22, and 24.

Third Embodiment

Figure 10A:
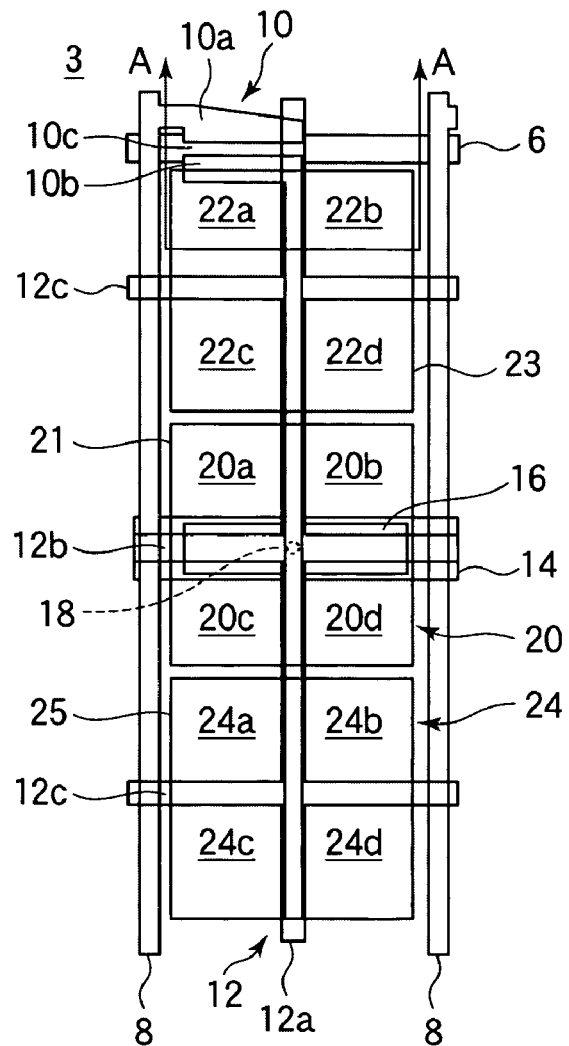
FIGS. 10A and 10B show a configuration of one pixel of a liquid crystal display according to a third embodiment of the invention.
Figure 10B:
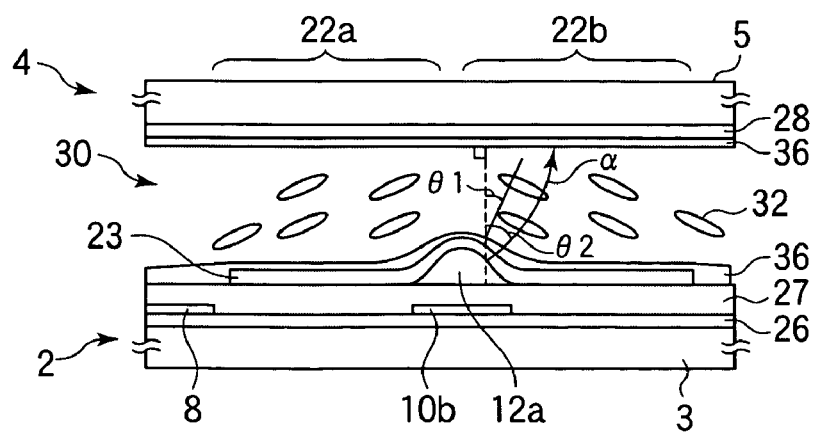
Figure 11:
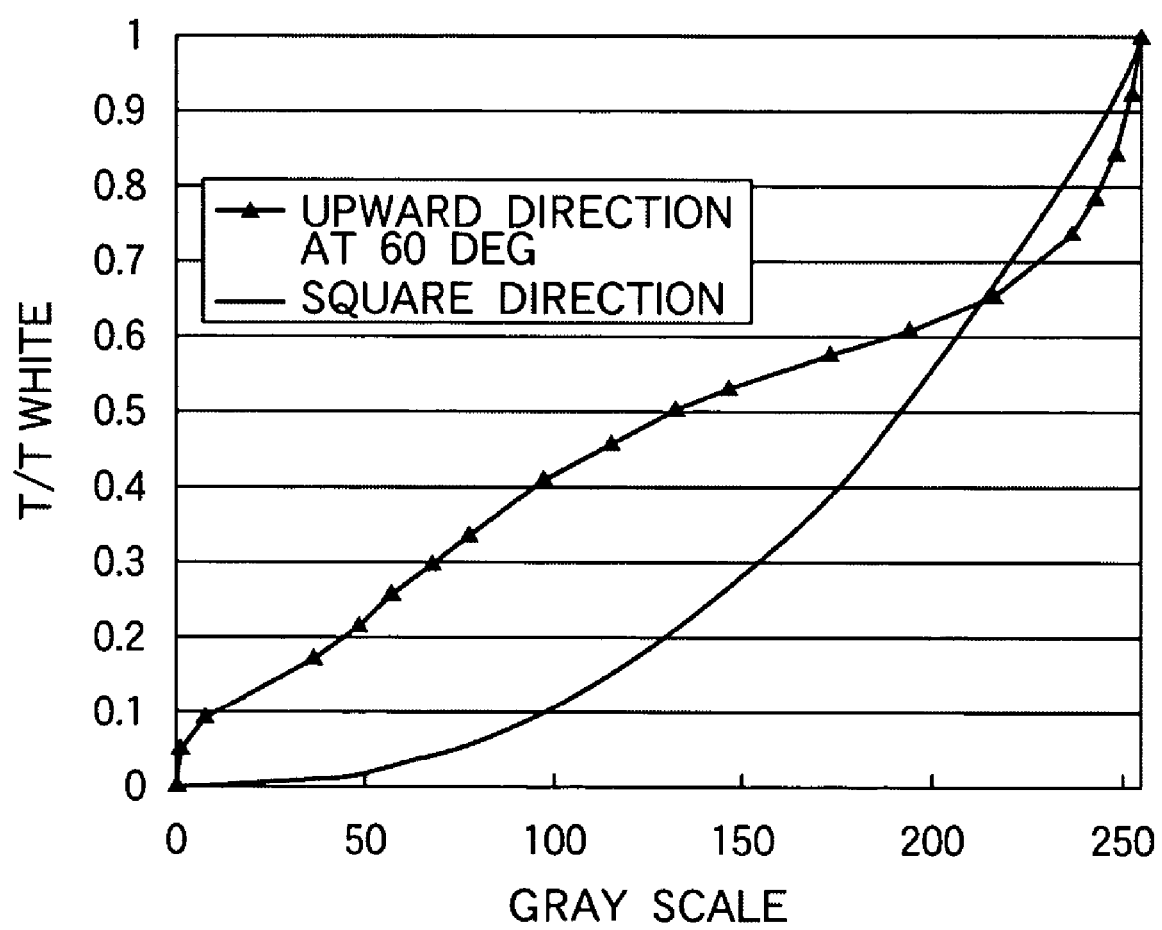
FIG. 11 shows gradation/luminance characteristics of a liquid crystal display according to the related art.
Figure 12:
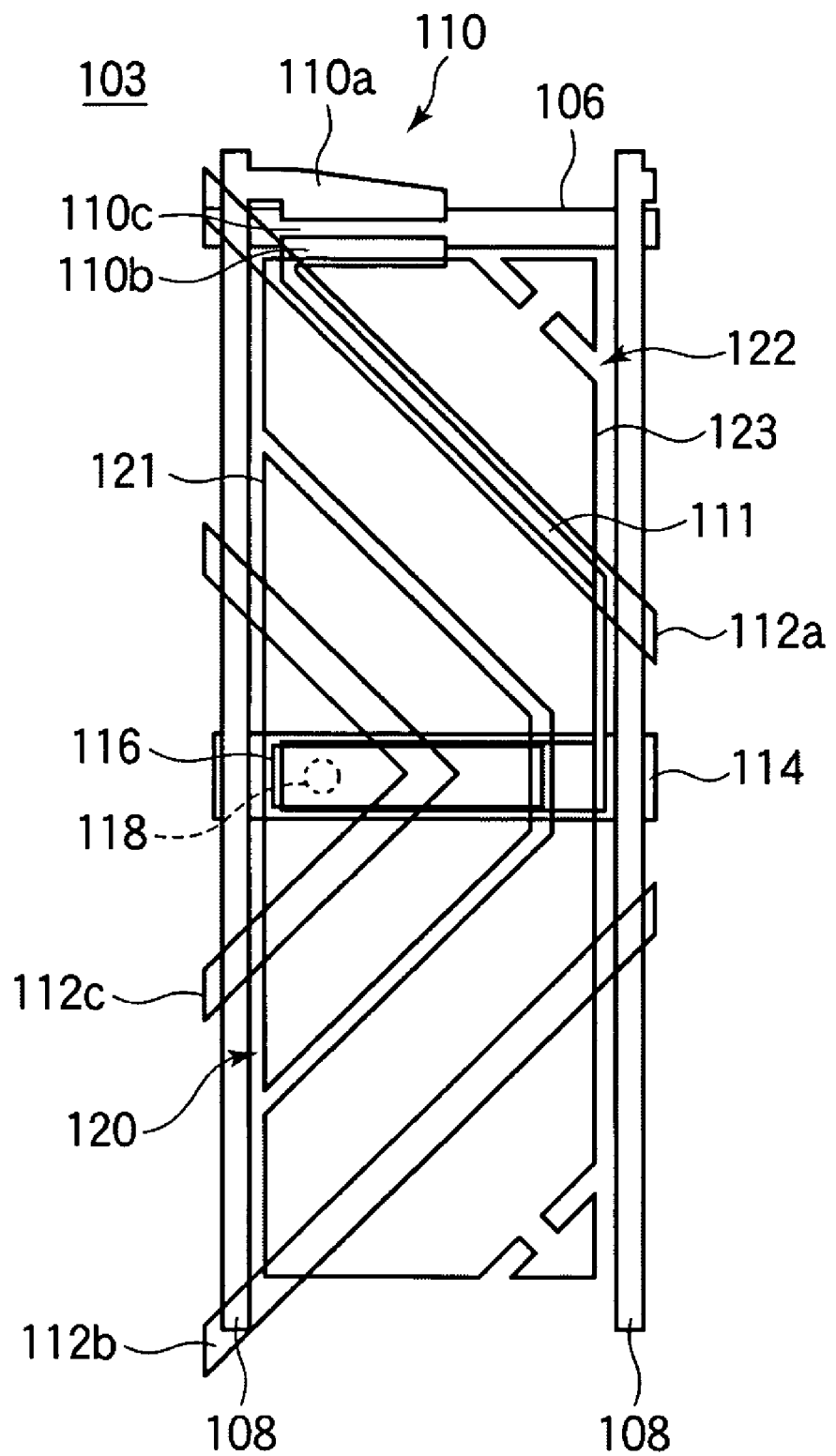
FIG. 12 shows a configuration of one pixel of the liquid crystal display according to the related art.

A liquid crystal display according to a third embodiment of the invention will now be described with reference to FIGS. 10A and 10B. The general configuration of the liquid crystal display of the present embodiment will not be described because it is similar to that of the liquid crystal display of the first embodiment. FIGS. 10A and 10B show a configuration of one pixel of the liquid crystal display of the present embodiment. FIG. 10A shows a configuration of one of a plurality of pixels in the form of a matrix as viewed in a direction normal to a glass substrate 3. FIG. 10B shows a section taken along the imaginary line A-A shown in FIG. 10A. As shown in FIGS. 10A and 10B, the liquid crystal display of the present embodiment is characterized in that it include a linear protrusion (an alignment regulating structure) 12 formed by patterning a transparent dielectric body provided under first and second pixel electrodes 21, 23, and 25 such that it protrudes from a glass substrate 3 rather than an opposite substrate 4.

In the case of the liquid crystal displays in the first and the second embodiments, the linear protrusion 12 formed on the opposite substrate 4 must be located in the middle of the pixel region in advance in consideration to possible miss-registration between the TFT substrate 2 and the opposite substrate 4. For example, when the linear protrusion 12 is disposed directly above a peripheral part of the second pixel electrode 23 as shown in FIGS. 4A and 4B, the top of the linear protrusion 12 must be located on the right side of the peripheral part of the second pixel electrode 23. When the top of the linear protrusion 12 is located on the left side of the peripheral part of the second pixel electrode 23, the result is the same as a state in which the linear protrusion 12 is formed with a small height h, and the alignment of the liquid crystal molecules are therefore disturbed. However, when the linear protrusion 12 is formed in the middle of the pixel region, the aperture ratio of the liquid crystal display will be substantially reduced.

Under the circumstance, in the liquid crystal display of the present embodiment, the linear protrusion 12 is formed on the TFT substrate 2 as shown in FIGS. 10A and 10B. The first and the second pixel electrodes 21, 23, and 25 are formed in an overlapping relationship so as to cover at least the top of the linear protrusion 12. As shown in FIG. 10B, the slope of the surface of the second pixel electrode 23 on a trunk portion 12a of the linear protrusion 12 is leveled by an alignment film 36. Therefore, an angle θ1 defined by a line normal to the surface of the alignment film 36 and a line normal to the opposite substrate 4 in FIG. 10B is smaller than an angle θ2 defined by the direction of an electric line of force a penetrating through the surface of the alignment film 36 and the line normal to the opposite substrate 4. As a result, when a voltage is applied between the substrates 2 and 4, the direction of alignment of liquid crystal molecules 32 is different from the direction of the electric line of force α, and the liquid crystal molecules 32 incline toward the trunk portion 12a of the linear protrusion 12. In the section shown in FIG. 10B, the liquid crystal molecules 32 are tilted from the direction perpendicular to the TFT substrate 2 clockwise in a division 22a and are tiled counterclockwise in a division 22b. Since the liquid crystal molecules 32 can be tilted in a different direction in each of the divisions 22a and 22b as thus described, the liquid crystal display of the present embodiment can provide the same advantage as that of the liquid crystal displays of the above embodiments.

What is claimed is:

1. A liquid crystal display, comprising:
   a substrate;
   an opposite substrate provided opposite to the substrate;
   a liquid crystal composition including a liquid crystal material and a polymer obtained by polymerizing a polymeric material by light or heat and sealed between the substrate and the opposite substrate;
   an alignment regulating structure for regulating the direction of alignment of the liquid crystal material;
   a gate bus line formed on the substrate;
   a drain bus line formed across the gate bus line with an insulation film interposed between them;
   a pixel transistor having a gate electrode electrically connected to the gate bus line, a drain electrode electrically connected to the drain bus line, and a source electrode provided above the gate electrode and opposite to the drain electrode with a predetermined gap left between them; and
   a pixel region having a first sub-pixel formed with a first pixel electrode electrically connected to the source electrode through a connection electrode and a second sub-pixel formed with a second pixel electrode which sandwiches an insulation film between itself and the connection electrode to form a predetermined electric capacitance and which is separated from the first pixel electrode.

2. A liquid crystal display according to claim 1, wherein the alignment regulating structure includes a trunk portion which is formed substantially in parallel with the drain bus line and across the first and second sub-pixels, a first branch portion which is substantially orthogonal to the trunk portion and formed in the region where the first sub-pixel is formed, a second branch portion which is substantially orthogonal to the trunk portion and formed in the region where the second sub-pixel is formed, the structure being formed to protrude from the opposite substrate.

3. A liquid crystal display according to claim 2, wherein the first sub-pixel is divided by the trunk portion, the first branch portion, and a peripheral part of the first pixel electrode to provide four divisions.

4. A liquid crystal display according to claim 3, wherein the liquid crystal material is tilted in a different direction in each of the divisions of the first sub-pixel with reference to a direction normal to the substrate.

5. A liquid crystal display according to claim 2, wherein the second sub-pixel is divided by the trunk portion, the second branch portion, and a peripheral part of the second pixel electrode to provide four divisions.

6. A liquid crystal display according to claim 5, wherein the liquid crystal material is tilted in a different direction in each of the divisions of the second sub-pixel with reference to the direction normal to the substrate.

7. A liquid crystal display according to claim 1, wherein the pixel region has a pair of the second pixel electrodes and wherein the two second pixel electrodes are disposed side by side in the direction in which the drain bus line extends so as to sandwich the first pixel electrode.

8. A liquid crystal display according to claim 1, wherein the first and second pixel electrodes are formed in a substantially square shape.

9. A liquid crystal display according to claim 1, wherein at least either the first or second pixel electrode has a slit portion formed at least in a part of the peripheral part so as to extend in a direction substantially in parallel with the direction in which the liquid crystal material inclines.

10. A liquid crystal display according to claim 9, wherein the slit portion is formed such that a cut-out thereof has a width in the range from 2 μm to 5 μm, inclusive, and a length of 3 μm or more.

11. A liquid crystal display according to claim 9, wherein the slit portion is formed at the peripheral part in the vicinity of the gate bus line.

12. A liquid crystal display according to claim 11, wherein the slit portion is formed at the peripheral part in the vicinity of the drain bus line.

13. A liquid crystal display according to claim 9, wherein the slit portion is not formed in a peripheral part where the first and the second pixel electrodes are adjacent to each other.

14. A liquid crystal display according to claim 1, wherein the alignment regulating structure is formed under the first and second pixel electrodes so as to protrude from the substrate instead of the opposite substrate.

15. A liquid crystal display according to claim 14, wherein:
the substrate has an alignment controlling film for controlling the alignment of the liquid crystal material formed on the first and second pixel electrodes;
the direction of alignment of the liquid crystal material in the vicinity of an inclined surface of the alignment controlling film located on the alignment regulating structure is different from the direction of an electric line of force generated when a voltage is applied; and
the liquid crystal material is tilted toward the alignment regulating structure.

16. A liquid crystal display according to claim 1, wherein the liquid crystal material is tilted in a direction substantially at 45° to the extending direction of the alignment regulating structure on the first and second pixel electrodes when a voltage is applied.

17. A liquid crystal display according to claim 1, wherein the connection electrode is formed so as to extend substantially in parallel with the drain bus line in an overlapping relationship with the trunk portion.

18. A liquid crystal display according to claim 1, wherein the substrate has a storage capacitor bus line formed substantially in parallel with the gate bus line and wherein the first branch portion overlaps the storage capacitor bus line.

19. A liquid crystal display according to claim 1, wherein the liquid crystal material has negative dielectric constant anisotropy and is aligned substantially perpendicularly to a surface of the substrate when no voltage is applied.

* * * * *